_United States Patent Office_

3,726,658
Patented Apr. 10, 1973

3,726,658
APPARATUS FOR ELECTRICALLY WELDING A
DOUBLE WALLED GLAZING UNIT
Kenneth Banks, St. Helens, England, assignor to Pilkington Brothers Limited, Liverpool, Lancashire, England
Filed Oct. 16, 1970, Ser. No. 81,339
Claims priority, application Great Britain, Oct. 17, 1969,
51,232/69
Int. Cl. C03b 23/14
U.S. Cl. 65—40                                                    13 Claims

ABSTRACT OF THE DISCLOSURE

A glass article, e.g. an all-glass multiple glazing unit, is manufactured by uniting at least two glass parts by a continuous weld. The regions of the glass parts to be united are heated to soften the regions and to form the desired weld. This step of heating the regions is performed by passing principal electrical heating currents through the whole of the region and then passing auxiliary electrical heating currents through only a part, i.e. the colder part, of the region.

BACKGROUND OF THE INVENTION

(1) Field of the invention

The present invention relates to the manufacture of glass articles and has particular application to the manufacture of all-glass multiple glazing units.

(2) Prior art

It is well known to manufacture a glass article by uniting two or more glass parts with a continuous weld. Moreover, it is known to manufacture all-glass multiple glazing units by uniting the margins of an assembly of glass sheets by a continuous peripheral weld, the central regions of the sheets which are bounded by the continuous weld, being pulled apart whilst the welded periphery is soft, to establish a desired spacing between the sheets.

In the manufacture of all-glass multiple glazing units two glass sheets are washed, dried, preheated and assembled at a welding station one above the other. Electrical heating currents are passed through an electrically conductive stripe deposited on one of the sheets of glass, generally on the upper surface of the upper glass sheet, to form a continuous peripheral electrical path, the flow of electrical heating currents through the stripe causing said stripe to be heated. The margins of the upper sheet underlying the stripe are heated by conduction from the stripe until the stripe attains a temperature at which it burns off and at this stage the heated margins have attained a temperature at which said glass is conductive to the electrical heating currents so that said heating currents now flow through the heated margins.

The margins of the lower sheet are heated by their close association with the heated margins of the upper sheet and as the heating of the margins of the upper sheet continues heat transfer through the glass causes the margins of the upper sheet to soften and to sag into contacting relationship with the margins of the lower sheet. The heating is continued until the margins of both sheets are softened and run together to form a continuous peripheral weld uniting the assembled sheets.

The electrical heating currents are in practice passed through only a part of the electrically conductive margins of the upper sheet at any given time and generally, with rectangular sheets, through one side only of the marginal region. To obtain uniform heating of the margins of a rectangular sheet it is normal to pass the electrical heating currents successively through the four sides of the marginal region so that four heating pulses constitute one complete heating cycle for the assembly. To maintain control of the heat input to the margins of the assembled sheets it is necessary to reduce the margins to a softened state by a number of successive cycles, generally eight or nine, so that a complete welding operation requires more than thirty successive heating pulses and in practice this has involved a welding time period of two minutes.

SUMMARY

According to the present invention there is provided a method of manufacturing a glass article by uniting an assembly of glass parts by a continuous weld, comprising heating the regions of the glass parts to be united to soften said regions and to form a continuous weld uniting the regions, the heating of said regions of at least one of the glass parts being performed by passing principal electrical heating currents through the whole of said region and by passing auxiliary electrical heating currents through only a part of said region.

The present invention has particular application to the manufacture of all-glass multiple glazing units and according to this aspect of the present invention a method of manufacturing an all-glass multiple glazing unit by uniting an assembly of glass sheets by a continuous peripheral weld, comprising heating the margins of the glass sheets to soften said margins and to form a peripheral weld uniting the margins, the heating of the margins of at least one of the glass sheets being performed by passing principal electrical heating currents through the whole of said margins and by passing auxiliary electrical heating currents through only a part of said margins.

Preferably the principal electrical heating currents impart a greater heat input to the glass than the auxiliary electrical heating currents, the said auxiliary electrical heating currents being used to boost the temperature of a relatively cold part of said region or margins.

The present invention also includes apparatus for manufacturing a glass article by uniting an assembly of glass parts by a continuous weld, comprising means for supporting the glass parts in desired relation, and means for heating the regions of the glass parts to be united to soften said regions and to form a continuous weld uniting the regions, said heating means including an electrical circuit arrangement for causing principal electrical heating currents to pass through the whole of said region of at least one of the glass parts and auxiliary electrical heating currents to pass through only a part of said region.

The invention further includes apparatus for manufacturing an all-glass multiple glazing unit by uniting an assembly of glass sheets by a continuous peripheral weld, comprising means for supporting the assembly of glass sheets, means for heating the margins of the glass sheets to soften said margins and to form a peripheral weld uniting the margins, said heating means including an electrical circuit arrangement for causing principal electrical heating currents to pass through the whole of said margins of at least one of the glass parts and auxiliary electrical heating currents to pass through only a part of said margins.

The electrical circuit arrangement preferably comprises a high tension transformer for delivering said principal heating currents to a pair of co-operating electrodes spaced apart along said region or margins, said currents passing through said region or margins between said electrodes by two different paths of equal length.

Also, the electrical circuit arrangement preferably comprises a high tension transformer, three or more electrodes spaced apart along said region or margins and switching means for selectively passing said auxiliary heating currents between any two of the electrodes and through the intermediate part of said region or margins.

DESCRIPTION OF THE PREFERRED EMBODIMENT

Figure 1:
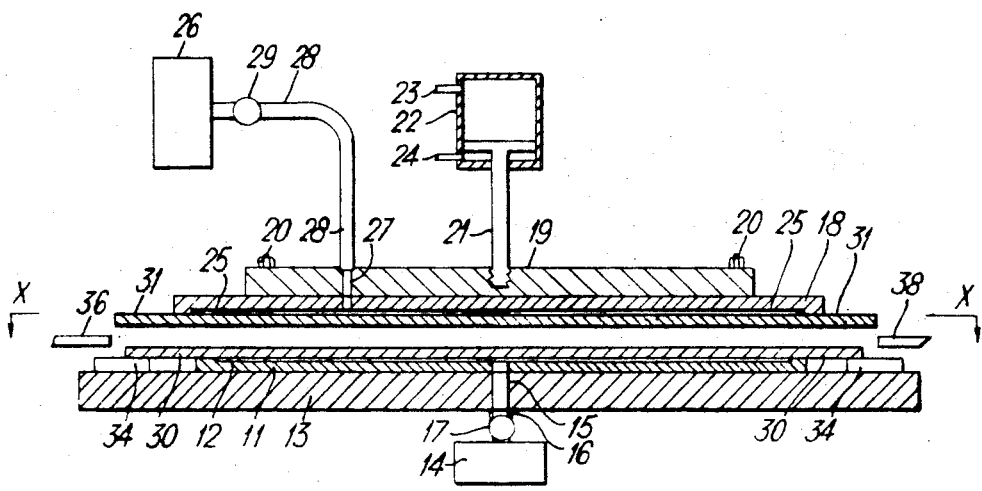
FIG. 1 is a vertical section through apparatus, by way of example, for use in the manufacture of all-glass double glazing units.

In the apparatus shown in FIG. 1, a lower sheet holding platen 11 is supported on a base 13 and has an arrangement of recesses 12 in its upper surface connectable with a low pressure source 14 by way of a passageway 15 through the platen 11 and the base 13, and a conduit 16 including a valve 17. Above the platen is an upper sheet holding platen 18 attached to the underside of a clutch platen 19 by bolts 20. The clutch platen 19 is supported by a piston 21 slidably disposed in a hydraulic cylinder 22. Alternating supply of hydraulic fluid through conduits 23 and 24 to the cylinder 22 permits the piston 21 to lift and lower the platens 18 and 19.

The upper sheet holding platen 18 has an arrangement of recesses 25 in its undersurface connectable with a low pressure source 26 by way of a passageway 27 passing through the platens 18 and 19, and a flexible conduit 28 including a valve 29.

In operation, with the platens 18 and 19 elevated and valves 17 and 29 closed to disconnect the sheet holding platens 11 and 18 from their low pressure sources 14 and 26 respectively, two glass sheets 30 and 31, preheated to a temperature of 480° C., are deposited between the sheet holding platens 11 and 18, the lower sheet 30 resting on the lower sheet holding platen 11 and the upper sheet 31 resting on sheet 30. The lower glass sheet 30 has a pore hole 32 drilled near one edge, and the upper sheet 31 has a peripheral stripe 33 of an electrically conductive material, e.g. a colloidal graphite, painted on its upper surface.

The lower sheet 30 has a length and width greater than the length and width of the lower sheet holding platen 11, and overlaps the platen 11 equally on all sides so that the margins of the lower sheet 30 are unsupported by the platen 11. Each corner of the lower sheet 30 is supported by a block 34 of a material which can withstand attack from molten glass, for example soapstone, and the upper surfaces of the blocks 34 lie in the plane of upper surface of the lower sheet holding platen 11.

The upper sheet 31 is longer and wider than the lower sheet 30, e.g. by about ½ in. and overlaps the lower sheet 30 equally on all sides.

When the sheets 30 and 31 are supported on the lower sheet holding platen 11 in the manner described above, the valve 17 is opened to connect the low pressure source 14 to the recesses 12 and the lower sheet 30 thereby becomes attached by suction to the platen 11. Hydraulic fluid is supplied to the cylinder 22 to lower the piston 21 and thereby the platens 18 and 19 until the upper sheet holding platen 18 contacts the upper surface of the upper sheet 31. At this point valve 29 is opened to connect the low pressure source 26 to the recesses 25 in the undersurface of the platen 18 and the upper sheet 31 thereby becomes attached by suction to the platen 18.

The upper sheet holding platen 18 has a length and width smaller than the upper sheet 31, and the sheet 31 extends equally from all sides of the platen 18.

With the glass sheets 30 and 31 attached to the platens 11 and 18 respectively by suction, fluid is again supplied to cylinder 22 to lift platens 18 and 19, and glass sheet 31 until sheets 30 and 31 are spaced apart by a small distance e.g. between 1/16 in. and 1/8 in.

At this stage the margins of the upper sheet 31 are heated, softened and united with the margins of the lower sheet 30 by a continuous peripheral weld in the manner to be described hereinafter, and after the margins of the two sheets 30 and 31 are united the platens 18 and 19 are elevated further to separate the unwelded central region of the upper sheet 31 attached to platen 18 further away from sheet 30 to establish a desired space therebetween, e.g. a space of ¼ in., air flowing into the space between the sheets 30 and 31 through the pore hole 32 to facilitate the elevation of the unwelded central region of the sheet 31.

When the desired spacing has been attained the welded peripheral margins of the sheets 30, 31 are cooled until they have hardened and become self supporting. The valves 17 and 29 are then closed to disconnect the sheet holding platens 11 and 18 from the low pressure sources 14 and 26 respectively and the platens 18 and 19 are elevated to permit the welded unit to be removed for subsequent treatment, e.g. annealing.

The welding operation will now be described.

Figure 2:
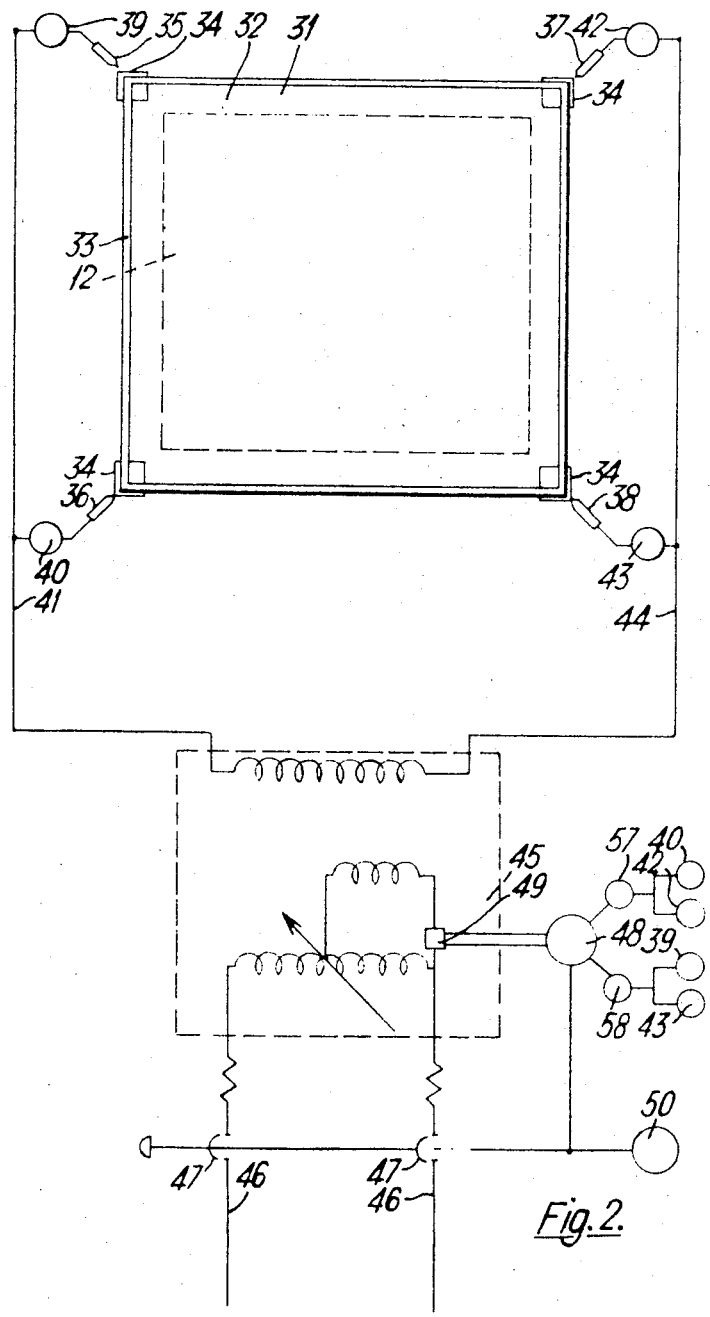
FIG. 2 is a section along line X—X in FIG. 1, and includes an arrangement for applying principal electrical heating currents to the upper glass sheet.

With the upper sheet 31 supported in spaced relationship above the lower sheet 30, four electrodes 35, 36, 37 and 38 lie adjacent the four corner regions of the upper sheet 31 as shown in FIG. 2. Electrodes 35 and 36 are connected through switches 39 and 40 respectively to an electric lead 41 and electrodes 37 and 38 are connected through switches 42 and 43 to an electric lead 44, leads 41 and 44 being connected to the output terminals of a transformer 45 which receives mains power by way of leads 46.

To heat the margins of the sheets 30 and 31, power is supplied to transformer 45 by closing a switch 47 in leads 46. A glass heating current output is produced on the leads 41 and 44 and with switches 40 and 42 open and switches 39 and 43 closed, the high tension current flows between electrodes 35 and 38, by way of electrically conducting stripe 33 on the upper sheet 31.

In flowing along the stripe 33 the current has two paths to follow, one path being by way of the corner adjacent the inoperative electrode 36 and the other path being by way of the corner adjacent the inoperative electrode 37. The flow of the current along the electrically conductive stripe 33 causes the stripe 33 to be heated.

Heat is transmitted by conduction from the stripe 33 to the underlying glass until the temperature in the stripe 33 is such that the stripe material burns off. At this stage the glass of the upper sheet 31 underlying the stripe has reached such a temperature that said glass is conductive to the heating current and thus the heating currents pass through the high temperature glass to effect further heating of the whole of the margins of the upper sheet.

When the glass of the margins of the upper sheet 31 is at uniform temperature, and the two said paths have the same length, the electrical heating currents will heat the margins of the sheet 31 uniformly. However, in practice, there is normally some variation in the resistance of the stripe 33 and some difference in the glass temperature along the margins of the sheet 31, thereby resulting in the heat input along one path being greater than the heat input along the other path and as the heating pulse continues the difference in the rate of heat input increases.

To assist in reducing this difference in heat inputs along said two paths, a current trip switch 48 associated with a current transformer 49 in the transformer 45 operates when a predetermined current flow is detected in the transformer 45 to reverse switches 39, 40, 42 and 43. The switches 40 and 42 are thereby closed and the switches 39 and 43 are opened so that the electrodes 36 and 37 become operational. The high tension current is now presented with two new paths along the periphery of sheet 31, one of said paths being by way of the corner adjacent the inoperative electrode 35 and the other path being by way of the corner adjacent the inoperative electrode 38.

It will be apparent that if during the initial heating pulse, i.e. when electrodes 35 and 38 are operational, one of the initial paths receives less heat input than the other path and is thus colder than the said one path, then when the switch 48 operates to render the electrodes 36 and 37 operational, each of the new paths will combine one hotter side with one colder side of the upper sheet 31. Nevertheless the difference in the resistance of the two new paths will initially be less than the difference in the resistance of the two initial paths at the termination of the initial heating pulse.

The switching of the above mentioned or principal electric heating currents is carried out automatically as follows:

The switches 39, 40, 42 and 43 are solenoid operated switches and each switch 39, 40, 42 and 44 is closed only when a holding electric current is passing through its associated solenoid. The electric current to the solenoid operated switches 39, 40, 42 and 43 is controlled by the current trip switch 48 which has two positions, a first position in which a solenoid holding current is passed only to the solenoids operating the switches 40 and 42 and a second position in which a solenoid holding current is passed only to the solenoids operating switches 39 and 43.

The current trip switch 48 thus trips each time a predetermined level of current flow is detected in the transformer 45 and each time switch 48 trips, the two closed switches 39, 43 or 40, 42 are opened and the two open switches 39, 43 or 40, 42 are closed so that current flow to the glass is switched between the electrodes 36, 37 and 35, 38.

The overall welding operation is controlled by a timer switch 50 which is closed to an operational position when starter switch 47 is closed. The switch 50 receives a signal each time the switch 48 trips and is actuated to open the switch 47 to terminate the welding operation when the rate of tripping by the switch 48 reaches a predetermined rate indicating a resistance in the glass afforded only when the margins of the assembly of sheets 30, 31 are in a desired softened condition.

It has been found by experiment that with the system described hereinbefore although three sides of a rectangular glass sheet can be heated to a substantially uniform temperature, it is possible for the fourth side, always a long side, to be colder than the other three sides and with this arrangement a uniform weld cannot be obtained.

Figure 3:
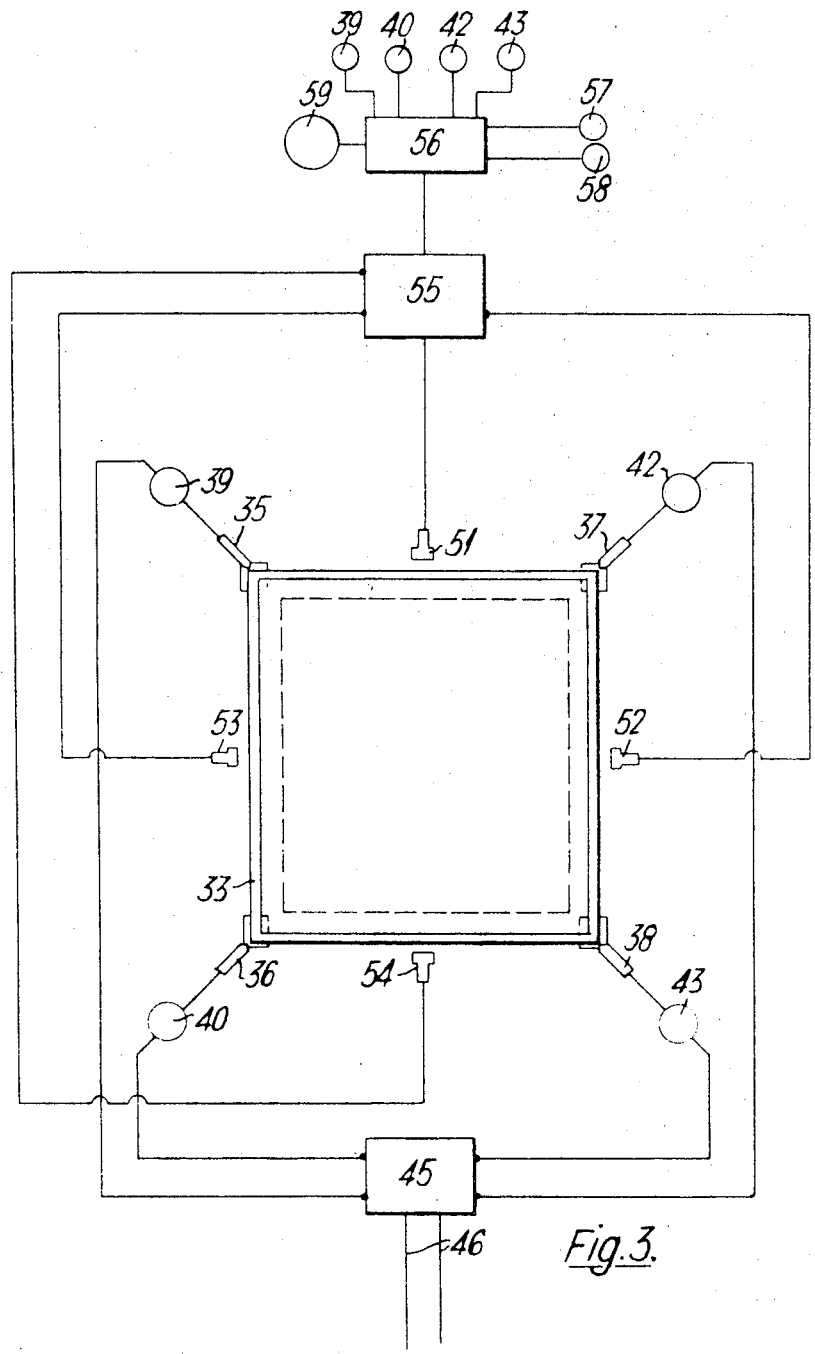
FIG. 3 is a section along the line X—X in FIG. 1, and includes an arrangement for applying auxiliary electrical heating currents to the upper glass sheet.

To overcome this difficulty an auxiliary heating operation is applied to selective parts of the margins of the upper sheet 31 to be softened and one arrangement for performing this auxiliary heating operation is shown in FIG. 3.

In the arrangement shown in FIG. 3 four temperature responsive devices, e.g. radiation pyrometers 51, 52, 53 and 54 are located to read the temperatures of the four side margins of the upper sheet 31 and each pyrometer 51, 52, 53 and 54 transmits a continuous signal indicative to the temperature of the part of the glass viewed, to a differential summator 55.

The differential summator 55 is a well known electrical device of the form which receives a plurality of signals simultaneously, compares said signals and identifies a difference in one of said signals from the remaining signals. In the present example, the differential summator 55 receives the four signals from the pyrometers 51, 52, 53 and 54 during a heating pulse by the principal heating currents, detects a low temperature signal from the coldest side of the upper sheet 31, and when the signal from the cold side reaches a predetermined level below the other signals, transmits a signal indicative of the location of the cold side to a switch arrangement 56. The switch 56, when actuated by a signal from the differential summator 55 to apply an auxiliary heating pulse, opens two normally closed switches 57 and 58 between the trip switch 48 and the switches 39, 40, 42 and 43 so that all the switches 39, 40, 42 and 43 open and the supply of principal heating current to the glass is terminated. The switch 56 then closes two adjacent switches 39 and 40 or 40 and 43 or 43 and 42 or 42 and 39 according to the signal received from the differential summator 55, and the output of the transformer 45 is thus passed only through the cold side identified by the differential summator 55.

The switch arrangement 56 is operated only when a signal indicating a predetermined temperature difference at the glass periphery is detected and the auxiliary heating pulse is thus applied for a predetermined time interval, sufficient to impart to the identified cold side sufficient heat to eliminate the temperature difference between this side and the other three sides. The time period for applying an auxiliary heating pulse is controlled by a timing device 59 within the switch arrangement 56.

When the auxiliary heating currents have been applied to the identified cold side for the time period determined by the timing device 59, the switch 56 releases and in so doing opens the closed switches 39, 40 or 40, 43 or 43, 42, 39 so that the four switches 39, 40, 42 and 43 are all open. Said switching arrangement 56 also closes the switches 57 and 58 so that the switches 39, 40, 42 and 43 are again controlled by the current trip switch 48 and the principal heating currents are re-applied to the margins of the upper sheet 31.

When the principal heating currents are re-applied the pyrometer signal from the side heated by the auxiliary heating currents will be closed to the signals of the other three sides and insufficient to cause the differential summator 55 to reactivate the switch arrangement 56.

With the above described arrangement the principal heating currents impart heat to all the margins of the upper sheet 31 so that when said principal currents are flowing maximum heating is being applied to the glass. The auxiliary heating currents are only applied to the glass when one side of the glass has a temperature a predetermined value below the other sides and thus counter any temperature difference in the edges of the glass which would otherwise adversely affect the welding operation.

In the specific embodiment described above the auxiliary heating currents are arranged to disconnect the principal currents to apply an auxiliary heating pulse. However, said auxiliary heating currents could be applied between each or a set number of switchings of the trip switch 48. Further, a separate power source could be provided for the auxiliary heating circuit and completely separate circuits including additional electrodes could be provided to completely separate the auxiliary heating from the principal heating and thus allow both forms of heating to be applied simultaneously.

The switches 39, 40, 42 and 43 may comprise diode stacks and the electrical power supply may comprise an alternating current at 50 cycles/sec. By these means one half of each cycle can be applied across two of the electrodes and the other half of the cycle applied across the other two electrodes so that the current is switched 100 times/sec.

The temperature responsive devices for the glass may comprise detectors such as radiation pyrometers. Alternatively, these may be provided electrical devices for measuring the resistance along the margins of the upper sheet 31.

I claim:

1. A method of manufacturing an all glass electrically welded double glazing unit, which method comprises superposing two flat glass sheets of generally rectangular form, holding one sheet spaced above the other and electrically heating the marginal regions of the sheets to form a continuous weld uniting the marginal regions of the two sheets, said electrical heating being effected by passing electrical heating currents through the marginal regions of the glass sheets by use of a first pair of electrodes and a second pair of electrodes, the first and second pairs being spaced apart from each other around the periphery of the sheets to form overlapping current paths and the two electrodes of each pair being diagonally opposite each other to provide two equi-distant peripheral current paths between them, wherein the electrical welding current is successively passed through the first and second pairs of electrodes in turn to weld the glass and balancing current is selectively passed between two adjacent electrodes, one from each pair of electrodes, to increase the temperature of the selected marginal region between those two electrodes when the temperature of that region is too low in relation to the remaining marginal regions of the sheets.

2. A method according to claim 1, in which the electrodes of each pair are located at opposite corner regions of the sheets, whereby the balancing current is passed along a selected side of the unit.

3. A method according to claim 2, in which flow of welding current between diagonally opposed electrodes is interrupted when balancing current passes between two adjacent electrodes.

4. A method according to claim 1, in which the duration of said balancing current passed between two adjacent electrodes is time controlled.

5. A method according to claim 1, in which the magnitude of the current in a welding current supply circuit is detected and used to control switching of the welding current from one pair of electrodes to the other pair of electrodes.

6. Apparatus for manufacturing an all glass electrically welded double glazing unit, which apparatus comprises locating means for holding in position a lower glass sheet of generally rectangular form, holding means for holding an upper glass sheet in spaced relationship above the lower glass sheet and welding means for passing electrical heating currents through marginal regions of the sheets to weld the marginal regions of the sheets together, said welding means comprising a welding current supply circuit, a first pair of electrodes for supplying welding current to the sheets, a second pair of electrodes for supplying welding current to the sheets, the second pair being spaced from the first pair around the periphery of the sheet position to form overlapping current paths, and the two electrodes of each pair being located at diagonally opposite parts of the sheet position to provide two equidistant current peripheral paths between them, first switch means operable to connect the welding supply circuits successively to the first and second pairs of electrodes in turn, and second switch means operable to connect selectively the current supply circuit to two adjacent electrodes, one from each said pair of electrodes, to increase selectively the temperature of the marginal region of the sheets between the said two adjacent electrodes.

7. Apparatus according to claim 6, wherein the electrical circuit arrangement includes means for sensing the temperature at locations along the region through which said electrical welding currents are passed.

8. Apparatus according to claim 7, wherein said sensing means comprise a plurality of radiation pyrometers for measuring the temperature of the glass at the respective location.

9. Apparatus according to claim 6, in which the electrodes of each pair are located at opposite corner regions of the sheets whereby operation of the second switch means raises the temperature of a selected side of the unit.

10. Apparatus according to claim 6, in which a timer is provided for controlling the duration of flow of the balancing current.

11. Apparatus according to claim 6, in which the welding current supply circuit includes a current level detector connected to said first switch means whereby switching from one pair of electrodes to the other is controlled in dependence on the current level detected.

12. Apparatus according to claim 6, in which the welding supply circuit includes a transformer for supplying said welding current as well as said balancing current.

13. Apparatus according to claim 7, including a collating device arranged to receive signals from said sensing means that indicate any relatively cold part of the regions through which the said electrical welding currents are passed, said collating device being adapted to terminate the flow of the electrical welding currents and to initiate the flow of the balancing current on detection of a colder part of the marginal regions of the sheets.

References Cited

UNITED STATES PATENTS

| 2,389,360 | 11/1945 | Guyer et al. | 65—40 |
| 2,774,190 | 12/1956 | Atkeson | 65—162 |

FOREIGN PATENTS

| 925,488 | 5/1963 | Great Britain | 65—58 |

ARTHUR D. KELLOGG, Primary Examiner

U.S. Cl. X.R.

65—58, 156, 162